United States Patent [19]
Yunus

[11] Patent Number: 6,133,776
[45] Date of Patent: Oct. 17, 2000

[54] SIGNAL PROCESSING CIRCUIT WHICH PROVIDES FOR A TEMPERATURE DEPENDENT VOLTAGE SOURCE THAT IS ALSO RATIOMETRIC TO THE SUPPLY VOLTAGE AND METHOD OF USE

[75] Inventor: Mohammad Yunus, Fremont, Calif.

[73] Assignee: Texas Instruments Incorporated, Dallas, Tex.

[21] Appl. No.: 09/470,678

[22] Filed: Dec. 23, 1999

[51] Int. Cl.[7] .................................................. G06G 7/14
[52] U.S. Cl. .......................................... 327/361; 327/513
[58] Field of Search .................................. 327/355, 361, 327/362, 512, 513, 530

[56] References Cited

U.S. PATENT DOCUMENTS

| | | | |
|---|---|---|---|
| 5,910,751 | 6/1999 | Winn et al. ........................... | 327/560 |
| 6,029,059 | 2/2000 | Bojer .................................... | 327/361 |

*Primary Examiner*—Jung Ho Kim
*Attorney, Agent, or Firm*—Russell E. Baumann; Frederick J. Telecky, Jr.

[57] ABSTRACT

A signal processing circuit is disclosed. The signal processing circuit comprises a sensor for receiving a voltage and providing a first signal based on at least one parameter. The signal processing circuit further includes a first digital to analog converter (DAC) for providing a supply voltage to the summer and a second DAC for providing a voltage ($V_{tc}$) which is dependent upon the supply voltage and a variation in temperature of the supply voltage. The signal processing circuit also includes a summer coupled to the first and second DACs for receiving the first signal and providing a first output and a gain circuit for receiving the first output and providing an output voltage. In accordance with the system and method of the present invention, a voltage $V_{tc}$ which is dependent on the supply voltage and a variation in temperature of the supply voltage can be utilized advantageously to minimize the number of DACs in the signal processing system. This technique can be extended to do temperature correction of first order or higher order (for example, polynomial type of correction), or piece wise linear temperature correction. The main benefits of this technique are minimal hardware use and filtered digitized temperature steps in the signal processing. It can be extended to calibrate out errors due to other sensed signals if the primary sensed signal is affected by those other signals.

11 Claims, 5 Drawing Sheets

SIGNAL PROCESSING CIRCUIT WHICH PROVIDES FOR A TEMPERATURE DEPENDENT VOLTAGE SOURCE THAT IS ALSO RATIOMETRIC TO THE SUPPLY VOLTAGE AND METHOD OF USE

FIELD OF THE INVENTION

The present invention relates to the generation of a temperature dependent reference voltage that is also ratiometric to the power supply voltage in a signal processing circuit. It can be extended to ratiometric to other sensed parameters of the system.

BACKGROUND OF THE INVENTION

Signal processing circuits used, for example, in an automative application typically require a temperature sensing feature to ensure its accuracy. Typically, signal processing circuits have temperature dependent variables that affect the accuracy of the output signal of the circuit. In fact, the accuracy of the output signal can be affected over the entire range of temperature that the processing circuit is operated. The accuracy of the output voltage is particularly important for automative applications as the signal for processing circuits are typically operated at an elevated temperature.

One commonly used method for sensing the temperature variation and digitize in a signal processing circuit is to compare a proportional to absolute temperature ($V_{ptat}$) voltage with a reference ($V_{ref}$) voltage that is insensitive to temperature using an analog to digital converter (A/D). Dividing the $V_{ptat}$ voltage with the $V_{ref}$ voltage generates a ratio, which is proportional to the temperature. This ratio can be in the form of a digital pulse stream, if a sigma delta modulator is used as an A/D. A digital filter can convert this to a digital word.

A bandgap circuit is conventionally used to provide the reference voltage to the processing circuit, since this the bandgap circuit is insensitive to temperature variations. However, the bandgap reference voltage is also insensitive to power supply voltage variation since the bandgap voltage is a physical constant. Thus, the temperature dependent output generated by the $V_{ptat}$ and $V_{ref}$ voltages will be independent of the power supply voltage.

A signal conditioning circuit usually requires a ratiometric output voltage over a wide temperature range. When the power supply fluctuates within the specified range, the output voltage of the circuit must vary over the whole temperature variation. The output voltage of the circuit must vary in a specified range. During the calibration a process correction at room temperature of the signal is fairly straightforward. The output signal typically remains ratiometric to the supply voltage at room temperature. However, the temperature calibration portion that is also ratiometric to supply is not as straightforward. If the $V_{ptat}$ and $V_{ref}$ voltages are used directly to correct the signal temperature related parameters for a fixed supply voltage, the output is fine for that voltage. However, as supply voltage varies the output error will increase beyond the narrow range over temperature due to independence of $V_{ptat}$ and $V_{ref}$ of the supply voltage. Accordingly, what is needed is a system and method for providing an output voltage which is both temperature dependent and also ratiometric to the supply voltage to replace $V_{put}$ and $V_{ref}$. The present invention addresses such a need.

SUMMARY OF THE INVENTION

A signal processing circuit is disclosed. The signal processing circuit comprises a sensor for receiving a voltage and providing a first signal based on at least one parameter. The signal processing circuit further includes a first digital to analog converter (DAC) for providing a supply voltage to the summer and a second DAC for providing a voltage ($V_{tc}$) which is dependent upon the supply voltage and a variation in temperature of the supply voltage. The signal processing circuit also includes a summer coupled to the first and second DACs for receiving the first signal and providing a first output and a gain circuit for receiving the first output and providing an output voltage.

In accordance with the system and method of the present invention, a voltage $V_{tc}$ which is dependent on the supply voltage and a variation in temperature of the supply voltage can be utilized advantageously to minimize the number of DACs in the signal processing system. This technique can be extended to do temperature correction of first order or higher order (for example, polynomial type of correction), or piece wise linear temperature correction. The main benefits of this technique are minimal hardware use and filtered digitized temperature steps in the signal processing. It can be extended to calibrate out errors due to other sensed signals if the primary sensed signal is affected by those other signals.

DETAILED DESCRIPTION

The present invention is directed toward an improvement in the generation of a temperature dependent reference voltage which is also ratiometric to the supply voltage in a signal processing circuit. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
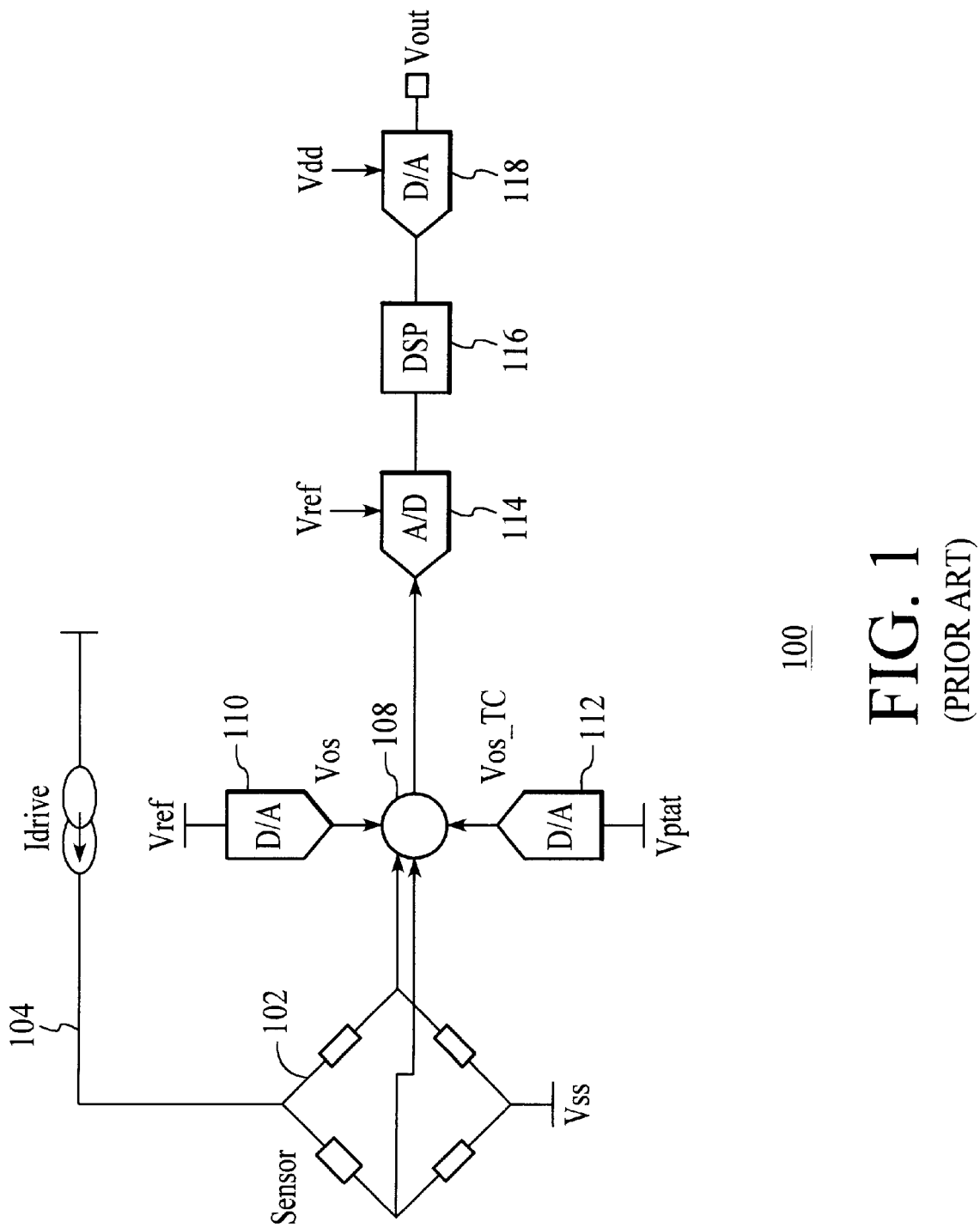
FIG. 1 illustrates a first conventional system to correct for temperature dependence due to the power supply voltage of an output signal using an analog to digital converter (A/D), digital signal processor (DSP) and a digital to analog converter (DAC).

There are two conventional techniques for correct temperature dependence due to the power supply voltage of the output voltage. FIG. 1 illustrates a first system 100 to correct for temperature dependence due to the power supply voltage of an output signal. Referring now to FIG. 1, bridge sensor 102 is coupled to $V_{ss}$ and also to a current source circuit 104.

Its outputs are applied to a summer 108 which receives inputs from two digital to analog converters (DACs) 110 and 112. DAC 10 receives an input from $V_{ref}$ and DAC 112 receives an input from $V_{ptat}$. The output from the summer 108 is provided to an analog to digital converter 114 which also receives an input from $V_{ref}$. Thereafter, a digital signal processing unit 116 receives the digital signal and provides that signal to a DAC 118. DAC 118 is referenced to $V_{dd}$ and provides an output signal ratiometric to the supply.

Operation of the Conventional System

The signal from the bridge sensor 102 is generated using the current source circuit 104. The current source circuit 104' is independent of $V_{dd}$. The temperature compensation of the gain is performed by adding an analog temperature dependent term within the current source circuit 104. The value of the voltage or current source is independent of $V_{dd}$. For some applications, the independence voltage of the source circuit 104 from $V_{dd}$ is a good feature.

However, signal processing circuits in automotive applications generally use $V_{dd}$ as a reference voltage. Accordingly, the independence of the voltage or current from $V_{dd}$ is not good for automative applications because the temperature of the circuit varies widely under automotive conditions. The output voltage is proportional to the measured parameter (pressure, yaw rate etc.) and to $V_{dd}$. For example, if the pressure is at the middle scale (50%) and supply voltage is 5V, then the output voltage is 2.5V. If $V_{dd}$ changes to 5.5V, the output voltage will change to 2.75V. Thus, output voltage is considered ratiometric to the supply.

Referring back to FIG. 1, the sensor 102 signal has its gain temperature corrected by using the current source circuit 104 with a temperature dependent term. However, the offset of the sensor 102 or the zero pressure, or any other parameter being sensed, still has temperature dependence (tc). The offset and offset tc is corrected using $V_{ref}$ and $V_{ptat}$. The signal is then digitized using an analog to digital correction via A/D 114. Sometimes additional corrections are performed using digital signal processing. The output voltage ($V_{out}$) is converted back to analog form by the DAC 118 using $V_{dd}$ as a reference. Thus, $V_{out}$ is proportional to the sensed parameter and to the supply voltage $V_{dd}$. However, the $V_{out}$ has quantization steps that oftentimes create recurring problems in feed back control systems.

In addition, the conventional system 100 of FIG. 1 requires accurate DACs. An accurate DAC has a low differential linearity error (<11 bits). These accurate DACs add costs and complexity to the system 100. Finally, any reduction in the number of DACs within system will reduce the overall cost of the system.

Figure 2:
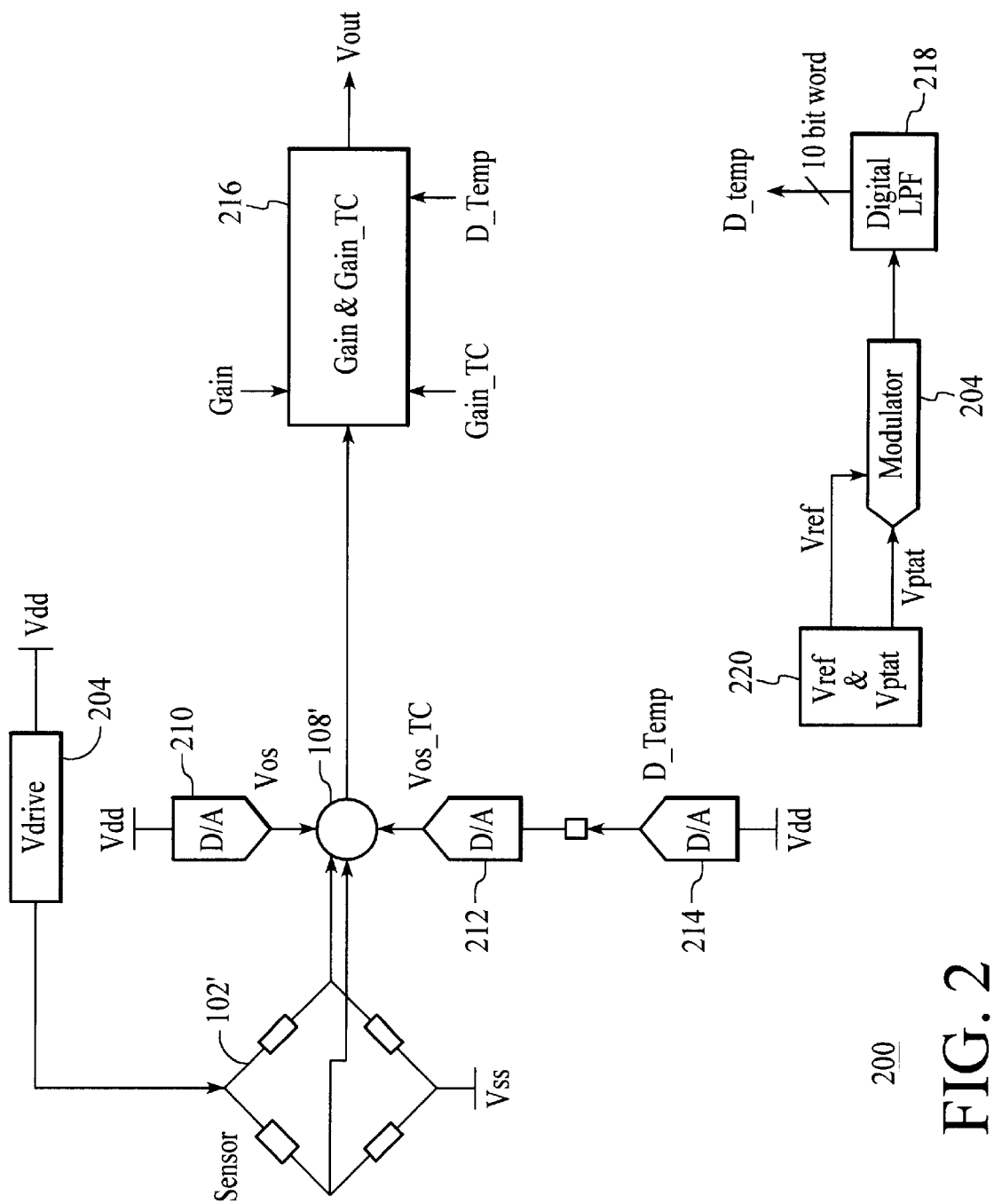
FIG. 2 illustrates a second conventional system to correct for temperature dependence due to the power supply voltage of an output signal using analog signal path corrected by digitized temperature.

To address some of the problems, a second conventional technique has been utilized to correct for temperature dependence. FIG. 2 illustrates a second conventional system 200 to correct for temperature dependence due to the power supply voltage of an output signal. In FIG. 2 many of the components are the same as in FIG. 1 and have similar reference numerals. However, the bridge sensor 102' receives inputs from a voltage circuit source 204 which is coupled to $V_{dd}$. As is seen, three DACs, 210, 212 and 214 provide inputs to the summer 108'. The output of the summer 108' is then provided to a gain circuit 216 which receives inputs from a digital lowpass filter 218. In addition, Gain and Gain_tc values are also provided to Gain circuit 216 via analog devices (not shown). Gain circuit 216 then provides the output voltage ($V_{out}$) based upon these inputs. Circuit 200 further includes a reference voltage $V_{ptat}$ signal circuit 220 Vref and $U_{ptat}$. The circuit 220 provides $V_{ref}$ and $V_{ptat}$ to a modulator 204. The modulator 204 then provides a signal to a digital lowpass filter 218. The digital lowpass filter 218 provides a digital word (D_Temp) to the gain circuit 210.

D_Temp along with Gain_Tc and Gain values are then provided to the gain amplifier circuit 216. The gain amplifier circuit 216 provides the output voltage. The system 200, although an improvement over the system 100 of FIG. 1 still requires several DACs 210, 212 and 214. As is seen, although a gain amplifier circuit 216 is utilized to eliminate the DAC for the output voltage, an additional DAC 214 is needed to compensate for the D_Temp digital word output from the digital lowpass filter 218.

In a preferred embodiment, if the pulse stream of temperature is obtained directly from the modulator 204 the number of DACs can be minimized. In so doing the overall cost and complexity of the system can be minimized. Also, the response time signal processing is less than in conventional systems since two major signal processing steps are eliminated. Accordingly, the system and method in accordance with the present invention minimizes the number of DACs while also improving the overall performance of the signal processing circuit.

Figure 3:
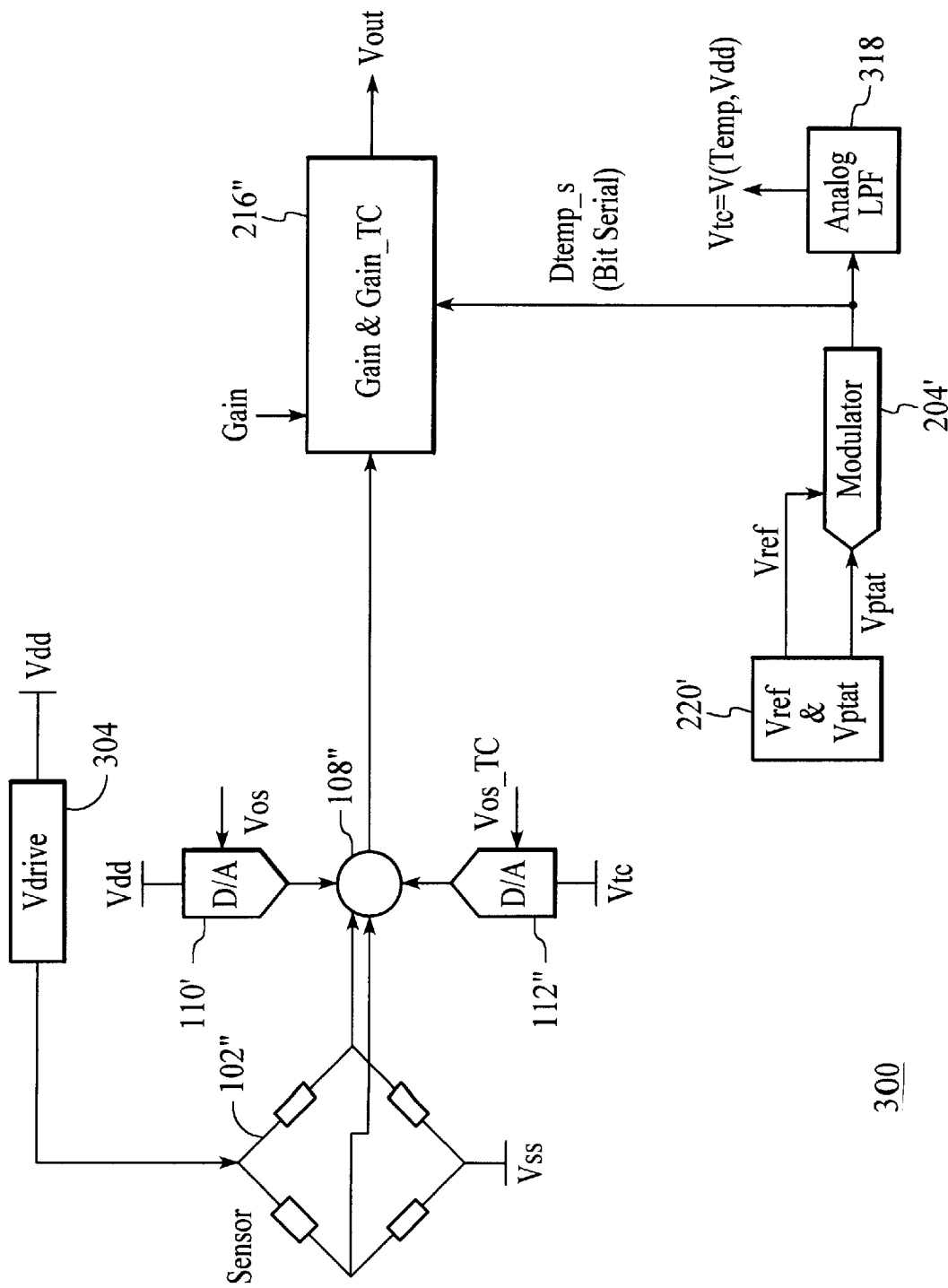
FIG. 3 is a first embodiment of a system in accordance with the present invention.

FIG. 3 is a first embodiment of a system 300 in accordance with the present invention. Many of the elements are similar to the elements from FIG. 2. However, a key difference is that fewer DACs are required. Fewer DACs are required because there is an analog lowpass filter 318 to replace the digital lowpass filter 218 of FIG. 2. In so doing, a voltage which is dependent upon variations of temperature and $V_{dd}$ ($V_{tc}$) is provided directly to the DAC 112 rather than requiring two DACs with $V_{dd}$ as reference to do the same function.

Operation of the Present Invention

In this embodiment, the sensor 102" output is ratiometric to $V_{dd}$. The offset is corrected using $V_{dd}$ as reference voltage. The offset temperature coefficient correction is done using a voltage proportional to $V_{dd}$ and temperature that is $V_{tc}$. The sensitivity correction is performed using the gain circuit. The gain temperature coefficient is corrected using a bit serial digital temperature (Dtemp_s). The digital pulse stream using $V_{ref}$ and $V_{ptat}$ is generated using the modulator 204'. The pulse density (number of ones in the pulse train for a fixed number of cycles) of this pulse stream is proportional to the ratio of the $V_{ptat}$ with respect to $V_{ref}$. Thus, pulse density is also proportional to temperature. The digital output voltage ($V_{out}$) swings from $V_{dd}$ to $V_{ss}$. Thus the average value of this pulse stream is temperature and supply dependent. The analog filter 302 converts this pulse stream to a analog voltage ($V_{tc}$). When $V_{dd}$ varies then the $V_{tc}$ varies proportionally between $V_{dd}$ and $V_{ss}$.

Moreover, when the temperature increases, the number of 1s increases thus increasing the average value of the Dtemp_s. Thus the filtered analog voltage is a function of $V_{dd}$ and temperature. Accordingly, through the present invention, $V_{tc}$ is provided to DAC 112" which is dependent upon temperature and $V_{dd}$. The digital temperature in bit stream format (Dtemp_s) can be provided from the modulator 204" directly to the gain amplifier 216" to correct gain over temperature variations.

Therefore, the generated voltage $V_{tc}$ can then be used for temperature compensation by the sensor 102". Accordingly, this technique can be extended to perform temperature correction of first order or higher order (for example, polynomial type of correction), or piece wise linear temperature correction as shown in FIGS. 4 and 5.

Figure 4:
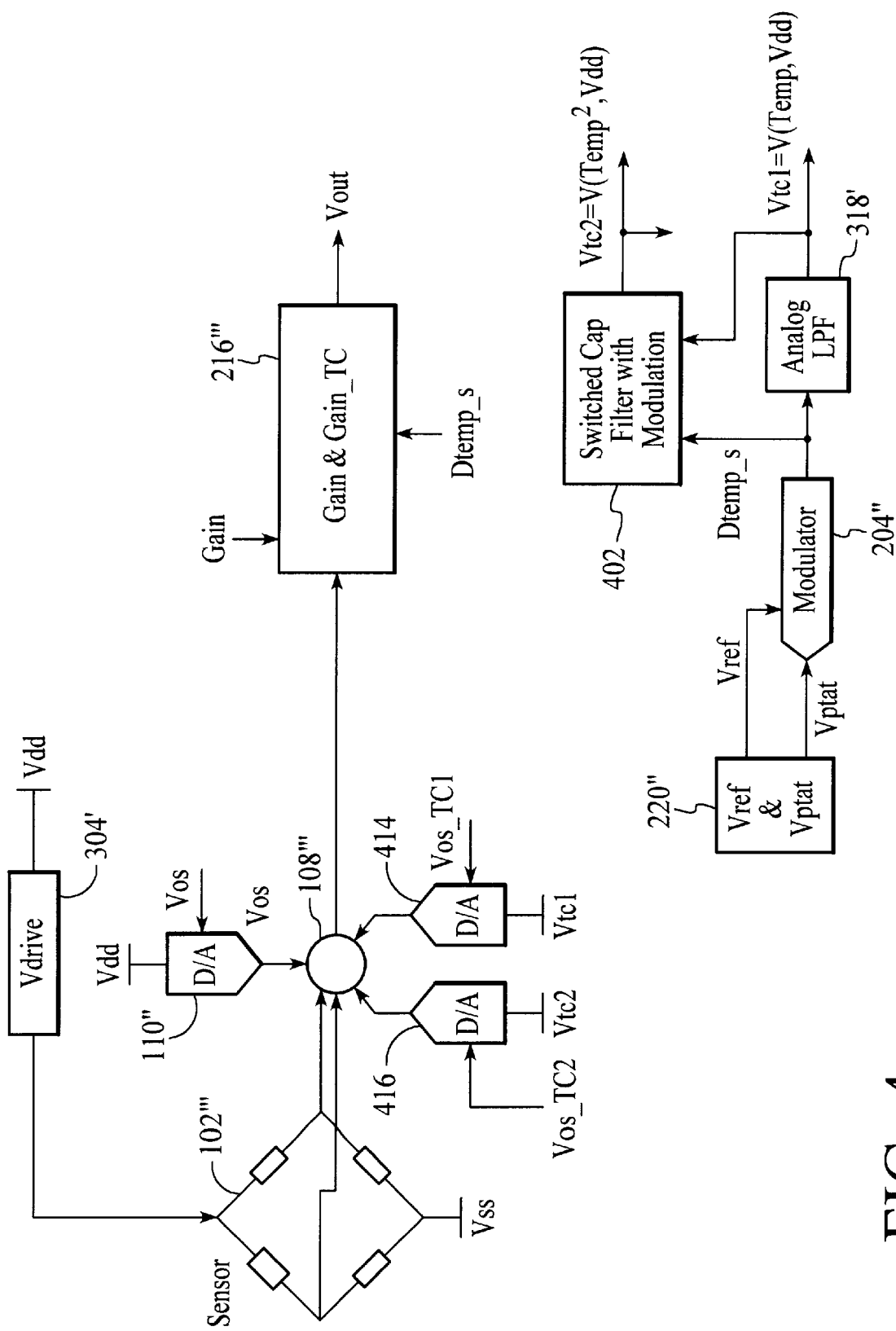
FIG. 4 is a second embodiment of a system in accordance with the present invention.
Figure 5:
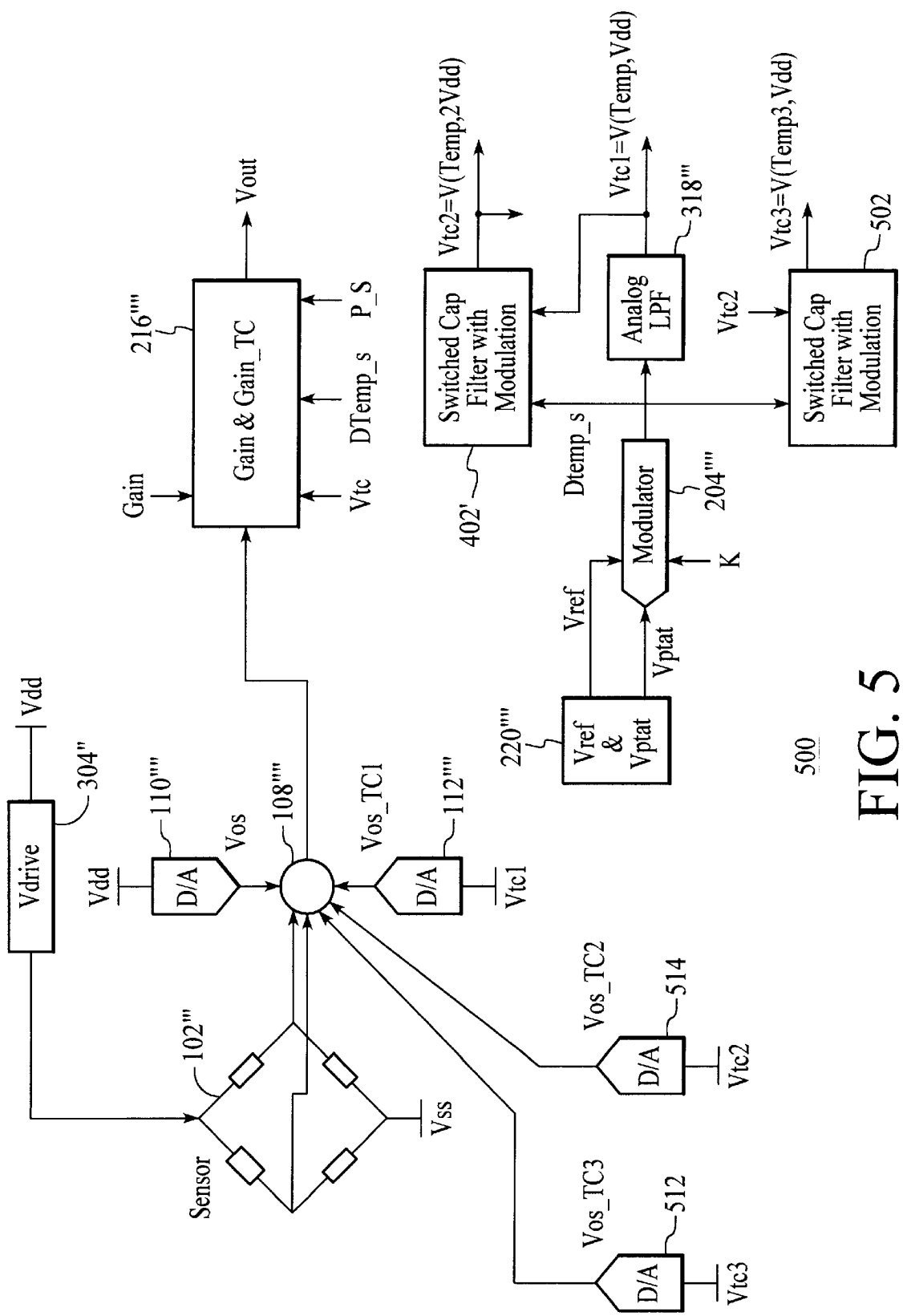
FIG. 5 is a third embodiment of a system in accordance with the present invention.

FIG. 4 is substantially similar to FIG. 3 except a switched capacitor filter 402 receives Dtemp_s and $V_{tc1}$ and provides an temperature square dependent voltage $V_{tc2}$. FIG. 5 is substantially the same as FIG. 4 except an additional switched capacitor 502 is utilized to provide a third order temperature dependent voltage $V_{tc3}$.

Advantages

In a method and system in accordance with the present invention, the number of DACs required are minimal and filtered digitized temperature steps in the signal processing are also minimized. The temperature dependent voltage $V_{tc}$ is free from quantization steps. Such quantization steps at low frequency are sometimes problematic in a closed loop control system. Thus, a low bandwidth low pass filter can be used to reduce digitizing noise to a very low level. Another advantage with a system and method in accordance with the present invention is there is no need for an accurate DAC. Thus, temperature related correction could be accomplished utilizing a simpler CMOS process (without capacitors). Thus, reducing the cost of the signal conditioning circuit.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A signal processing circuit comprising:

a sensor for receiving a voltage and providing a first signal based on at least one parameter;

a first digital to analog converter (DAC) for providing a supply voltage to the summer;

a second DAC for providing a voltage ($V_{tc}$) which is dependent upon the supply voltage and a variation in temperature of the supply voltage;

a summer coupled to the first and second DACs for receiving the first signal and providing a first output; and a gain amplifier circuit for receiving the first output and providing an output voltage, wherein the first signal is ratiometric to the supply voltage.

2. The signal processing system of claim 1 which includes a voltage source circuit for providing the voltage to the sensor.

3. The signal processing circuit of claim 2 further comprises:

a voltage generation circuit for providing a reference voltage ($V_{ref}$) and a voltage based on the absolute temperature ($V_{ptat}$);

a modulator for receiving $V_{ref}$ and $V_{ptat}$ and providing a digital signal representative of the temperature; and an analog lowpass filter coupled to the modulator for providing $V_{tc}$.

4. The signal processing circuit of claim 3 wherein the gain amplifier circuit also receives a gain value and the digital signal from the modulator.

5. The signal processing circuit of claim 4 wherein the digital signal comprises a digital serial bitstream.

6. A signal processing circuit comprising:

a sensor for receiving a voltage and providing a first signal based on at least one parameter;

at least two digital to analog converters (DACs), at least one of the two DACs for providing a supply voltage to the summer and at least the other of the two DACs for providing a voltage ($V_{tc}$) which is dependent upon the supply voltage and a variation in temperature of the supply voltage;

a summer coupled to the at least two DACs for receiving the first signal and providing a first output; and a gain amplifier circuit for receiving the first output and providing an output voltage, wherein the first signal is ratiometric to the supply voltage.

7. The signal processing system of claim 6 which includes a voltage source circuit for providing the voltage to the sensor.

8. The signal processing circuit of claim 7 further comprises:

a voltage generation circuit for providing a reference voltage ($V_{ref}$) and a voltage based on the absolute temperature ($V_{ptat}$);

a modulator for receiving $V_{ref}$ and $V_{ptat}$ and providing a digital signal representative of the temperature; and an analog lowpass filter coupled to the modulator for providing $V_{tc}$.

9. The signal processing circuit of claim 8 wherein the gain amplifier circuit also receives a gain value and the digital signal from the modulator.

10. The signal processing circuit of claim 9 wherein the digital signal comprises a digital serial bitstream.

11. The signal processing circuit of claim 8 wherein at least one switched capacitor receives the digit signal and provides at least one additional temperature dependent voltage.

* * * * *